US011609111B2

(12) United States Patent
Angus et al.

(10) Patent No.: US 11,609,111 B2
(45) Date of Patent: Mar. 21, 2023

(54) GAS FLOW, PRESSURE AND BTU/HOUR ANALYZER WITH A SMART DEVICE

(71) Applicant: Watts Regulator Co., North Andover, MA (US)

(72) Inventors: Michael T. Angus, Derry, PA (US); Kevin Fisk, Vernon (CA); Richard Huber, Harmony, PA (US); R. Craig Campbell, Cranberry Township, PA (US); George Davis, Pittsburgh, PA (US); Matthew Meurer, Pittsburgh, PA (US); Robert Parks, Pittsburgh, PA (US)

(73) Assignee: Watts Regulator Co., North Andover, MA (US)

( * ) Notice: Subject to any disclaimer, the term of this patent is extended or adjusted under 35 U.S.C. 154(b) by 619 days.

(21) Appl. No.: 16/725,768

(22) Filed: Dec. 23, 2019

(65) Prior Publication Data

US 2020/0209036 A1 Jul. 2, 2020

Related U.S. Application Data

(63) Continuation of application No. 29/675,362, filed on Dec. 31, 2018, now Pat. No. Des. 906,144.
(Continued)

(51) Int. Cl.
*G01F 15/06* (2022.01)
*G01F 15/063* (2022.01)
(Continued)

(52) U.S. Cl.
CPC .............. *G01F 15/063* (2013.01); *G01F 1/42* (2013.01); *G01K 1/024* (2013.01); *G01K 13/00* (2013.01);
(Continued)

(58) Field of Classification Search
CPC .......... G01F 15/06; G01F 15/063; G01F 1/42; G01K 1/024; G01K 13/00; G01L 19/086;
(Continued)

(56) References Cited

U.S. PATENT DOCUMENTS 5,251,480 A 10/1993 Brunson et al.
6,684,757 B2 2/2004 Peterson
(Continued)

OTHER PUBLICATIONS

Flexible Axis Meter Fam Datasheet, 2 pages.
(Continued)

*Primary Examiner* — Tung S Lau
(74) *Attorney, Agent, or Firm* — Day Pitney LLP; Anthony A. Kassas

(57) ABSTRACT

A system monitors gas flow and pressure to a gas appliance in a fluid network comprising an analyzer. The analyzer has a housing defining an inlet, an outlet, and an interior in fluid communication with the inlet and the outlet. At least one sensor is coupled to the analyzer and configured to generate at least one signal related to gas being supplied to the gas appliance. A smart device communicates with the analyzer, wherein the smart device has a user interface and is configured to monitor, store and display data. The smart device can present any or all of a plurality of parameters such as the flow of gas, a capacity of the flow of gas, a temperature, a pressure of the gas and the like to a user based on signals from sensors.

15 Claims, 14 Drawing Sheets

Related U.S. Application Data

(60) Provisional application No. 62/787,007, filed on Dec. 31, 2018.

(51) Int. Cl.
*G01F 1/42* (2006.01)
*G01K 1/024* (2021.01)
*G01K 13/00* (2021.01)
*G01L 19/08* (2006.01)
*G01P 1/00* (2006.01)
*G01P 15/00* (2006.01)
*G05D 7/06* (2006.01)

(52) U.S. Cl.
CPC .............. *G01L 19/086* (2013.01); *G01P 1/06* (2013.01); *G01P 15/00* (2013.01); *G05D 7/0635* (2013.01)

(58) Field of Classification Search
CPC ............. G01L 19/0023; G01L 19/0092; G01L 19/143; G01P 1/06; G01P 15/00; G05D 7/0635; H04L 12/2827; H04L 12/2825; H04L 2012/2841; H04L 2012/285; G06Q 50/06
See application file for complete search history.

(56) References Cited

U.S. PATENT DOCUMENTS

| | | | |
|---|---|---|---|
| 7,143,645 B2 | 12/2006 | Benson et al. | |
| 7,343,795 B2 | 3/2008 | Winter | |
| 7,493,811 B2 | 2/2009 | Koch et al. | |
| D630,536 S | 1/2011 | Pettit | |
| 8,264,360 B2 | 9/2012 | Struyk | |
| 8,264,361 B2 | 9/2012 | Struyk | |
| 8,863,734 B2 | 10/2014 | Shaffer | |
| 9,020,769 B2 * | 4/2015 | Rada | G01D 4/00 702/81 |
| 9,035,781 B2 | 5/2015 | Struyk | |
| 9,322,694 B2 | 4/2016 | Seehoffer et al. | |
| 9,638,559 B1 | 5/2017 | Zummo et al. | |
| 11,231,193 B2 * | 1/2022 | Guan | F24F 11/30 |
| 2005/0007260 A1 | 1/2005 | Winter et al. | |
| 2011/0061014 A1 * | 3/2011 | Frader-Thompson | G01D 4/002 715/771 |
| 2015/0045971 A1 | 2/2015 | Endel et al. | |
| 2017/0131174 A1 * | 5/2017 | Enev | E03B 7/07 |
| 2017/0370577 A1 | 12/2017 | Senkyr et al. | |
| 2018/0143037 A1 * | 5/2018 | Kamel | H02J 3/381 |
| 2018/0216742 A1 | 8/2018 | Korten et al. | |
| 2018/0330242 A1 * | 11/2018 | Dubois | G06Q 10/067 |
| 2019/0097865 A1 * | 3/2019 | Xu | A61B 5/4809 |
| 2019/0212180 A1 | 7/2019 | Stetsenko et al. | |
| 2020/0319324 A1 * | 10/2020 | Au | H04W 48/16 |

OTHER PUBLICATIONS

Tactical Flow Meter; 1" Tactical Flow Meter Datasheet, 2 pages.
Extended European Search Report in corresponding application 19275155.0 dated May 6, 2020.

* cited by examiner

GAS FLOW, PRESSURE AND BTU/HOUR ANALYZER WITH A SMART DEVICE

CROSS-REFERENCE TO RELATED APPLICATION

This application claims priority to U.S. Provisional Patent Application No. 62/787,007, filed Dec. 31, 2018 and U.S. Design patent application No. 29/675,362, filed Dec. 31, 2018, each of which is incorporated herein by reference.

BACKGROUND OF THE INVENTION

1. Field of the Invention

The subject disclosure relates to a system having an analyzer coupled with a smart device that can measure and record fluid flow, fluid pressure and BTU/hour as delivered to a gas device. The system may also measure temperature and movement of a connected appliance during commissioning, start-up, repair and normal use.

2. Background of the Related Art

Many appliances run on gas such as natural gas or propane. The applications are wide including standby home generators, commercial kitchens, home kitchens, boilers, furnaces, roof top unit HVAC units, fireplaces, pool heaters and the like. In order for such applications to work properly, proper gas flow is required. For example, improper gas flow can cause a surging effect in generators. Low gas flow may also cause an appliance to run inefficiently and, thereby, raise the cost of operating the appliance.

It can be difficult to identify gas flow issues whether it be at the time of commissioning the appliance, upon start-up or during normal usage. Service technicians typically install a manometer that only measures the pressure of the gas in the supply network. Whether mechanical or digital, a manometer can be difficult and time consuming to install. As for logging data, one relies on the service technician to maintain the data manually.

SUMMARY

In view of the above, a need exists for a system that quickly and easily installs into the supply network for identification of gas supply issues at the equipment level. The system would also be user friendly and allow for data logging and reporting of a plurality of parameters over an extended period of time.

In one embodiment, the system is a portable 3-in-1 gas flow meter, digital manometer, and calculator that helps service technicians and installers perform equipment start-up, commissioning, and quickly diagnose gas flow, pressure or capacity issues for gas burning equipment. The system streamlines the start-up and commissioning process of gas burning device while logging data via wireless technology that can be viewed immediately on a tablet, computer or smart phone using a software application. As a result, the system replaces a manometer, flow meter and calculator to boost efficiency and accuracy of the start-up, commissioning and troubleshooting processes.

The present disclosure includes a method of installing and servicing a gas appliance comprising the steps of temporarily installing an analyzer upstream from an inlet of the gas appliance and connecting a smart device to the analyzer using a short range wireless communication protocol. The analyzer has at least one sensor that communicates at least one signal to the smart device using the short range wireless communication protocol. The short range wireless communication protocol is selected from the group consisting of: Bluetooth; near-field communication (NFC); WIFI; radio broadcasting; satellite communication; RADAR; cellular communication; infrared communication; wireless local area network (WLAN); and the like. Preferably, the smart device stores and displays data related to the at least one signal, the at least one signal being: a first signal related to a flow of gas being supplied to the gas appliance; and a second signal related to a pressure of the gas being supplied to the appliance; and the smart device calculates a gas flow capacity based on the first signal. The first signal can be generated by a differential pressure sensor and the second signal is generated by a barometric pressure sensor. When the smart device is connected to the Internet contemporaneously with the analyzer being temporarily installed, the smart device can relay the data related to the at least one signal and the gas application to the Internet for access by a use. The method may also include providing: a first quick-connect fitting for an inlet of the analyzer; and a second quick-connect fitting for an outlet of the analyzer; and providing indicia on the analyzer configured to identify the inlet and the outlet of the analyzer. In one embodiment, indicia on the analyzer indicates a warning condition, a power on/off condition, and a wireless communication active status.

The subject technology is also directed a system for monitoring gas flow and pressure to a gas appliance in a fluid network comprising an analyzer. The analyzer has a housing defining an inlet, an outlet, and an interior in fluid communication with the inlet and the outlet. At least one sensor is coupled to the analyzer and configured to generate at least one signal related to gas being supplied to the gas appliance. A smart device communicates with the analyzer and has a user interface configured to monitor, store and display data. The smart device can present any or all of a plurality of parameters such as the flow of gas, a capacity of the flow of gas, a temperature, a pressure of the gas and the like to a user based on signals from sensors.

In one embodiment, the system includes a second pressure sensor configured to generate a second signal related to a pressure of the gas being supplied to the appliance. The system may also include a third pressure sensor configured to generate third signal related to an ambient barometric pressure. Preferably, the first pressure sensor is a differential flow through pressure sensor with an inlet port and an outlet port.

The housing can have an interior divided into a flow portion and an electronics portion with an inlet passage and an outlet passage extending between the flow portion and the electronics portion. The first pressure sensor is in the electronics portion with the inlet port being aligned to the inlet passage and the outlet port being aligned to the outlet passage. A flow tube extends between the inlet and the outlet in the flow portion. The flow tube has: an outlet orifice aligned with the inlet passage; an inlet orifice aligned with the outlet passage; and an obstruction member between the outlet orifice and the inlet orifice to create a pressure differential so that gas flow from the inlet to the outlet passes through the flowtube with a scavenge portion of the gas flow passing out the outlet orifice, through the inlet passage and into the inlet port of the differential pressure sensor and when the scavenge portion exits the outlet port, the scavenge portion passes though the outlet passage into the inlet orifice back into the fluid network.

The system may also have a printed circuit board (PCB) in the interior having the first pressure sensor mounted thereto as well as a wireless communication module and memory configured to store data related to the first signal and the second signal. Preferably, a safety shut-off valve connects to the fluid network and is in communication with the analyzer and/or the smart device so that the analyzer and/or the smart device selectively actuates the safety shut-off valve based upon the first signal being outside a predetermined value such as an over-flow, over-pressure, over-temperature, over-capacity, or excessive movement condition. Quick connect fittings on the analyzer make it easy to temporarily put the analyzer into the fluid network. The housing can defines clip mounts and for a battery pack.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION OF PREFERRED EMBODIMENTS

The subject technology overcomes many of the prior art problems associated with monitoring and evaluating gas burning devices, whether it be in a residential or commercial setting, natural gas, propane and the like. The advantages, and other features of the technology disclosed herein, will become more readily apparent to those having ordinary skill in the art from the subject disclosure.

In brief overview, the subject technology can temporarily or permanently be installed to monitor and record vital parameters related to the operation of gas burning devices at commissioning, initial start-up and during the operational life of the device. The subject technology is compact, easy to install, bundles a variety of functions, and records, shares and displays data. The subject technology can monitor any combination or all of gas flow, gas flow capacity, gas pressure, barometric pressure, temperature of the system and/or inside the appliance as well as movement of the appliance.

Figure 1A:
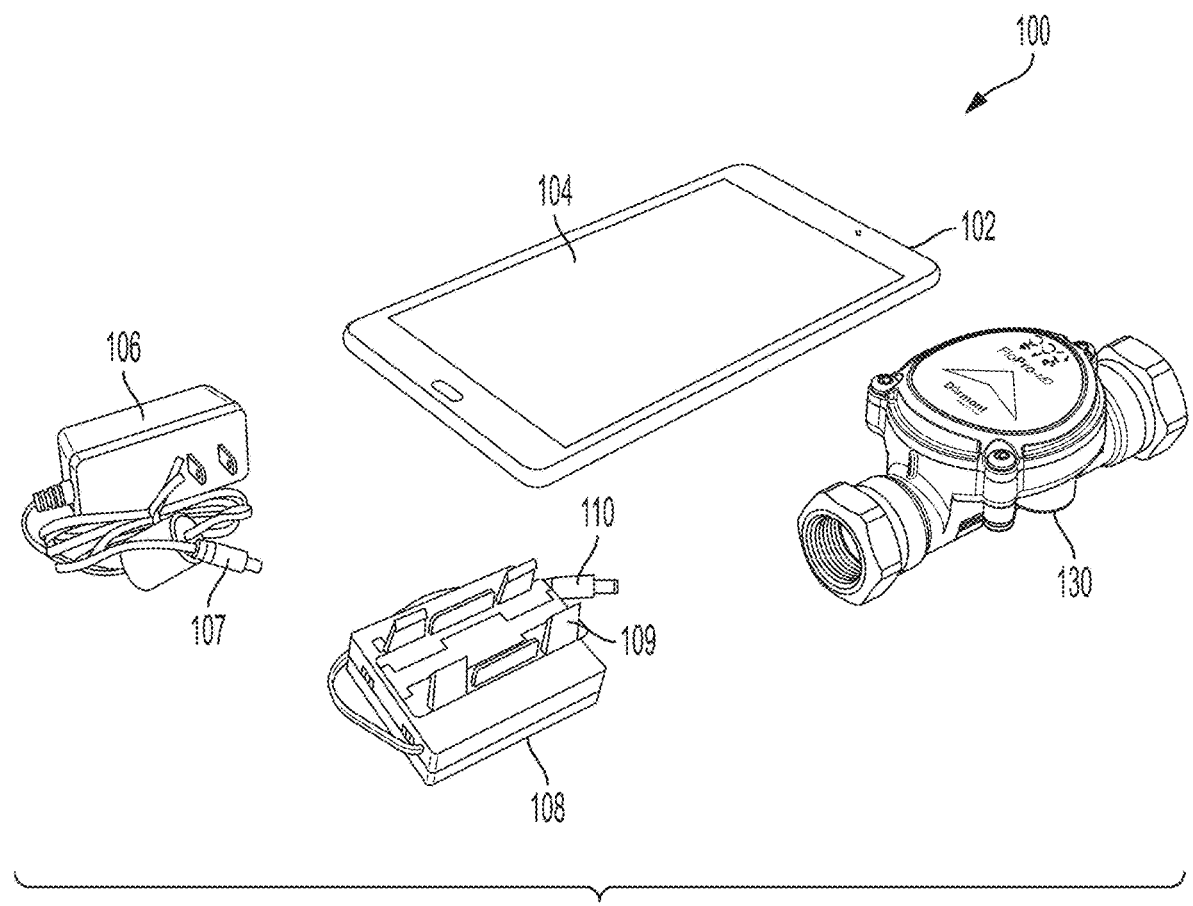
FIG. 1A is a perspective view of an analyzer, a smart device, a battery pack for the analyzer and a power cord for the smart device and/or analyzer in accordance with the subject disclosure.
Figure 1B:
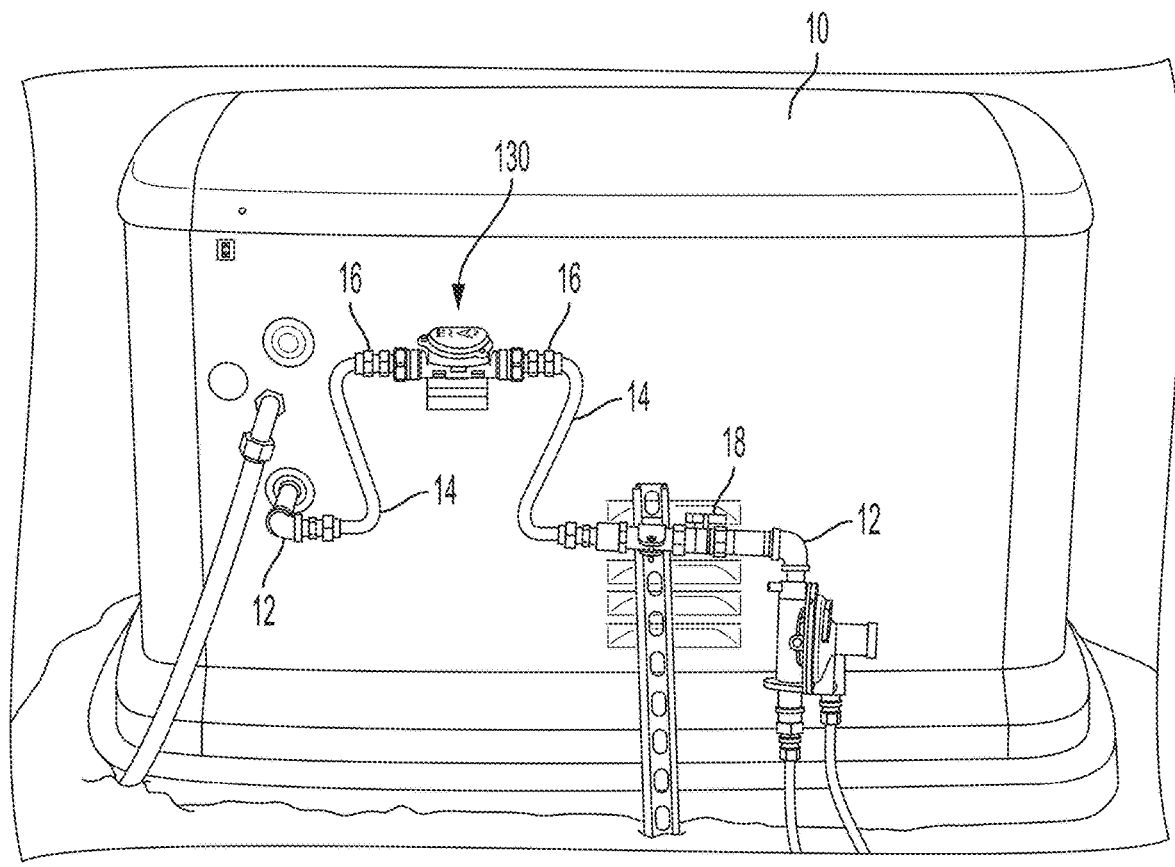
FIG. 1B illustrates an analyzer with an attached battery pack installed into a fluid network of a gas device in accordance with the subject disclosure.

Referring now to FIGS. 1A and 1B, an isolated perspective view and an installed view of a system 100 for monitoring gas flow and pressure to a gas device 10 are illustrated. In FIG. 1B, the gas device 10 is a residential back-up generator. The system 100 includes an analyzer 130 that connects in-line with a fluid network 12 providing gas to the device 10. The analyzer 130 is powered by a battery pack 108. The fluid network 12 includes flexible tubing 14 that terminates in connectors 16 for coupling to the analyzer 130. The fluid network 12 also includes a shut-off 18 to close flow during maintenance or installation/removal of the analyzer 130.

The system 100 also includes a smart device 102 for communicating with the analyzer 130. The smart device 102 has a user interface touch-screen 104 as well as other buttons, microphones, ports (e.g., USB, power etc.) and the like for customary input-output operations. The smart device 102 is configured to monitor, store and display graphs and summaries of the signals received from the analyzer 130. The smart device 102 is also capable of WiFi connections so that data and other parameters may be shared and sent by email.

The system 100 has a DC power supply 106 with a power cord 107 for connecting the analyzer 130 to a power outlet when available. Alternatively, the analyzer 130 can be powered by the battery pack 108 with a power cord 110. The battery pack 108 is configured to selectively clip to the analyzer 130 without impeding operation thereof. The system 100 may also include various fittings, flexible tubing, pipes and the like for permanently or temporarily connecting the analyzer 130 into the fluid network.

Referring to FIGS. 2A-2D, various views of the analyzer 130 in isolation are shown. The analyzer 130 has a housing 132 defining an inlet 134 and an outlet 136. As only shown in FIG. 2A, the analyzer 130 may also include a female and male quick-disconnect fitting 133a, 133b to allow quick and easy installation in a fluid network. Nipples 135 insert between the inlet 134 and outlet 136 and fittings 133a, 133b. When the fluid network includes flexible tubing with complimentary quick-disconnect fittings, the analyzer 130 can be repeatably connected and disconnected. When the analyzer 130 is removed, the quick-disconnect fittings of the fluid network can be coupled together to return the fluid network to an operational condition. The inlet 134 and the outlet 136 can be ¾ inch female NPT or any other required size to conveniently couple to the fluid network. Preferably, the housing 132 is aluminum that is anodized black. In one embodiment, SnapFast® quick-disconnect fittings available from Dormont are used for speedy installation and removal without leaking.

Figure 2A:
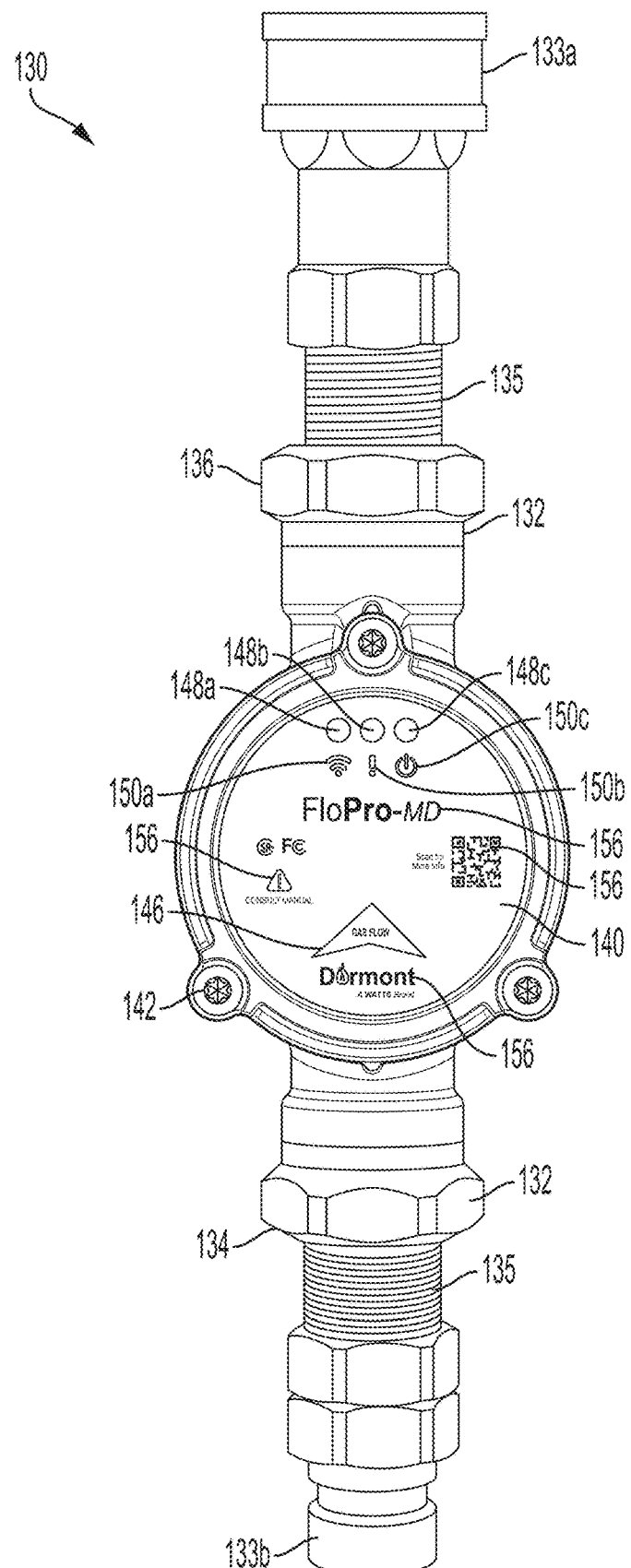
FIG. 2A is a top view of an analyzer with quick-disconnect fittings in accordance with the subject disclosure.
Figure 2B:
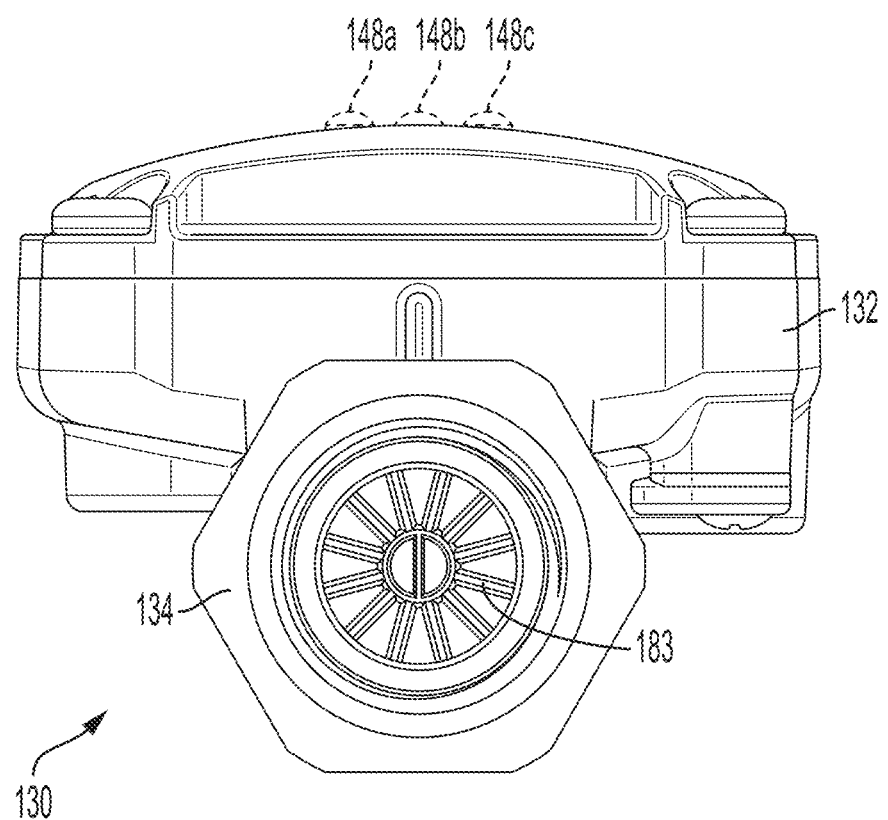
FIG. 2B is an end view of an analyzer in isolation in accordance with the subject disclosure.
Figure 2C:
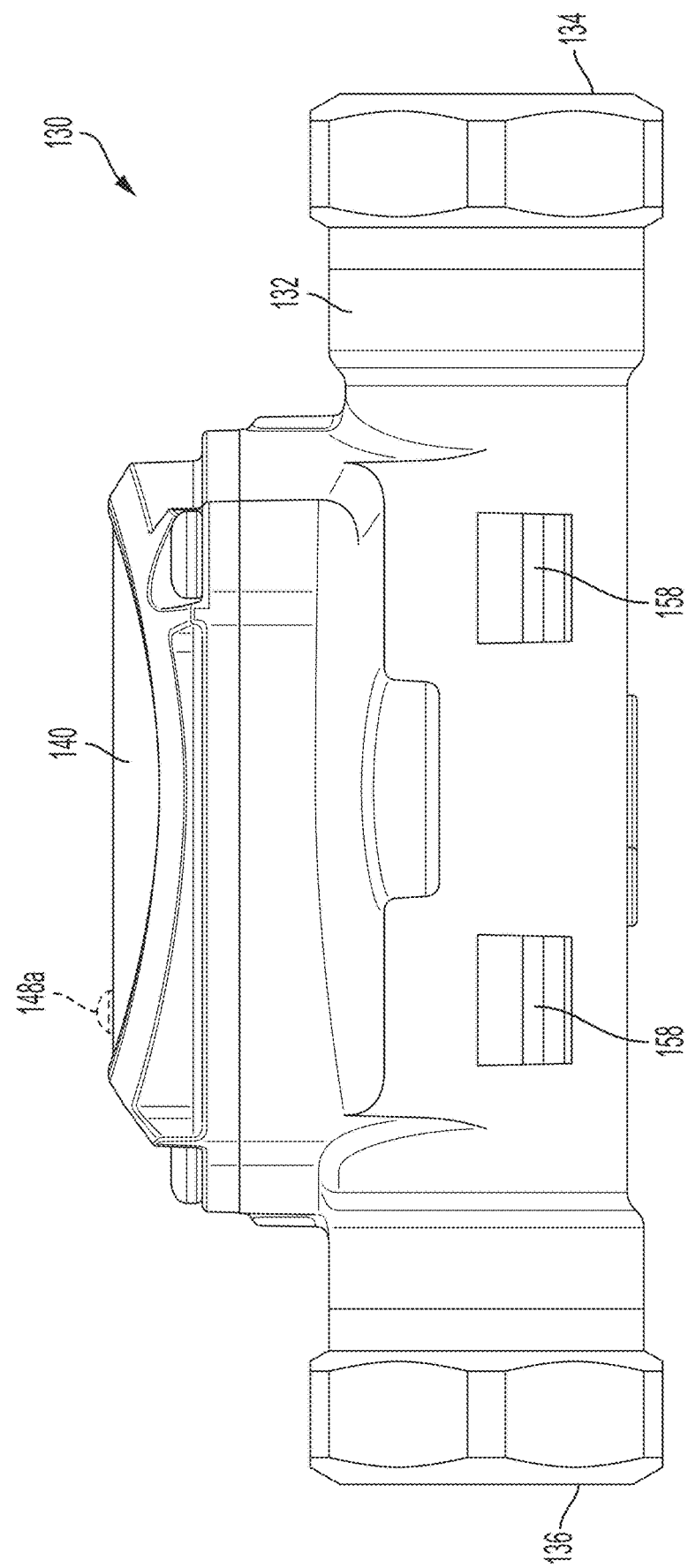
FIG. 2C is a side view of an analyzer in isolation in accordance with the subject disclosure.
Figure 2D:
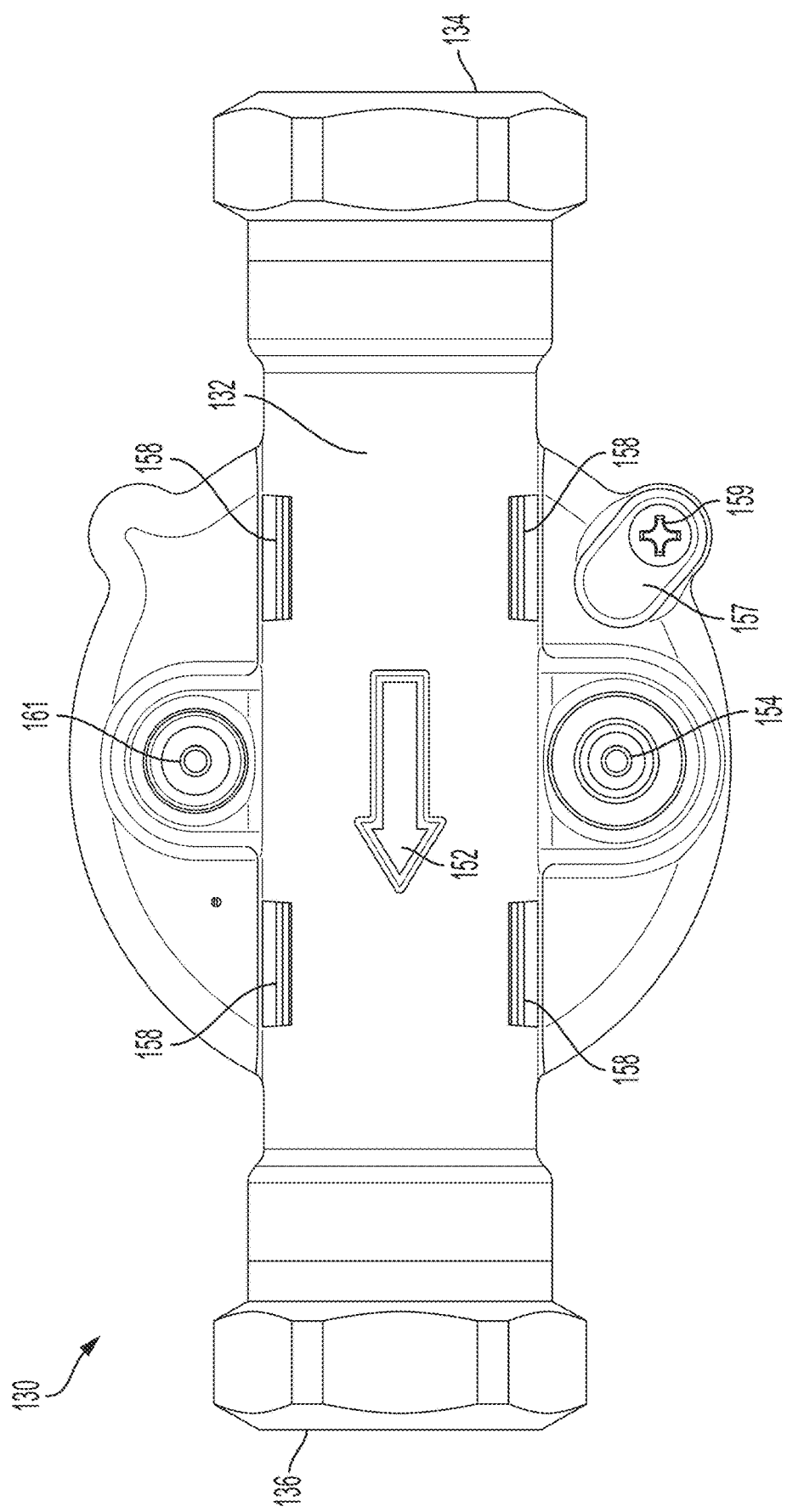
FIG. 2D is a bottom view of an analyzer in isolation in accordance with the subject disclosure.
Figure 3:
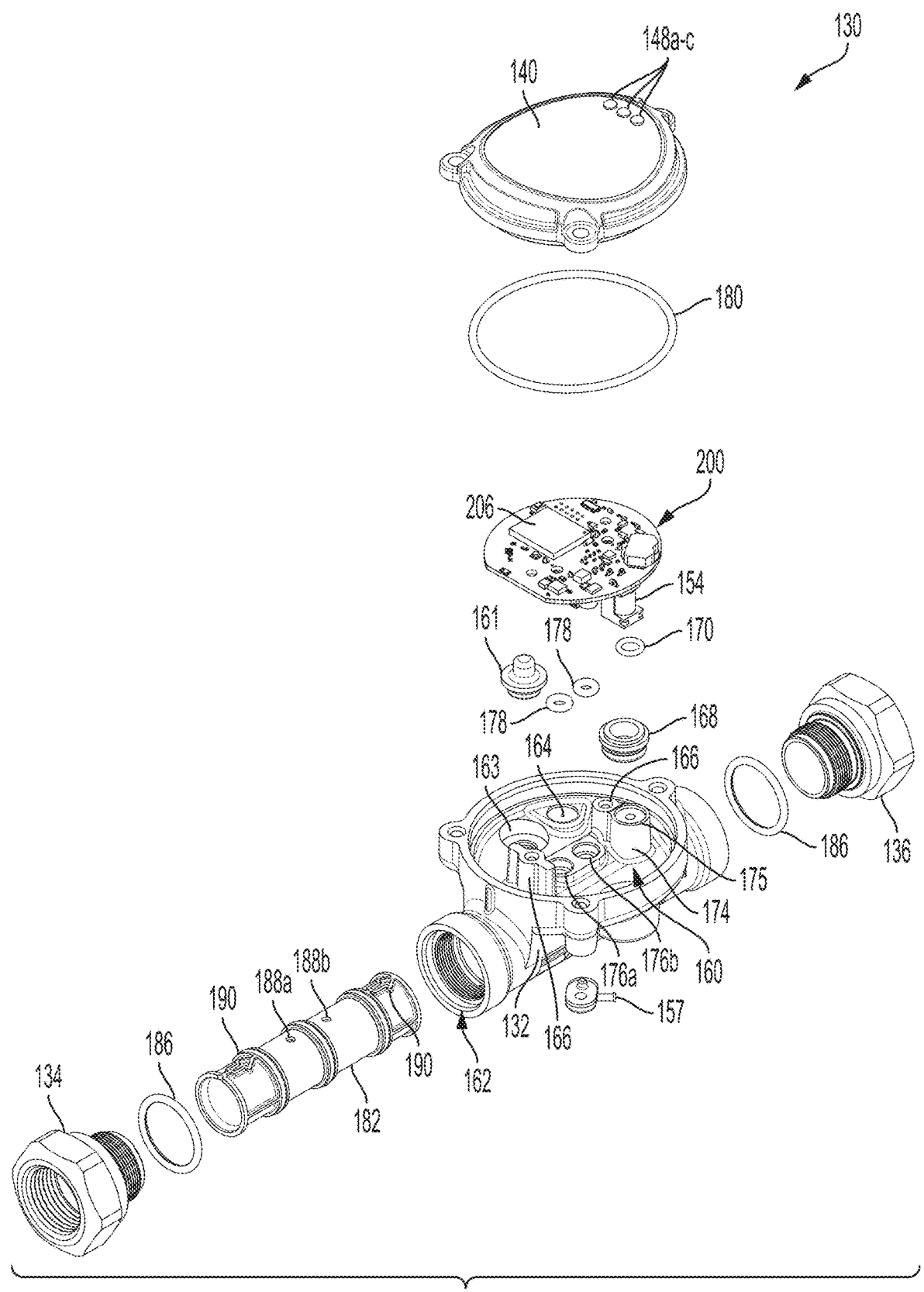
FIG. 3 is an exploded perspective view of an analyzer in accordance with the subject disclosure.
Figure 4A:
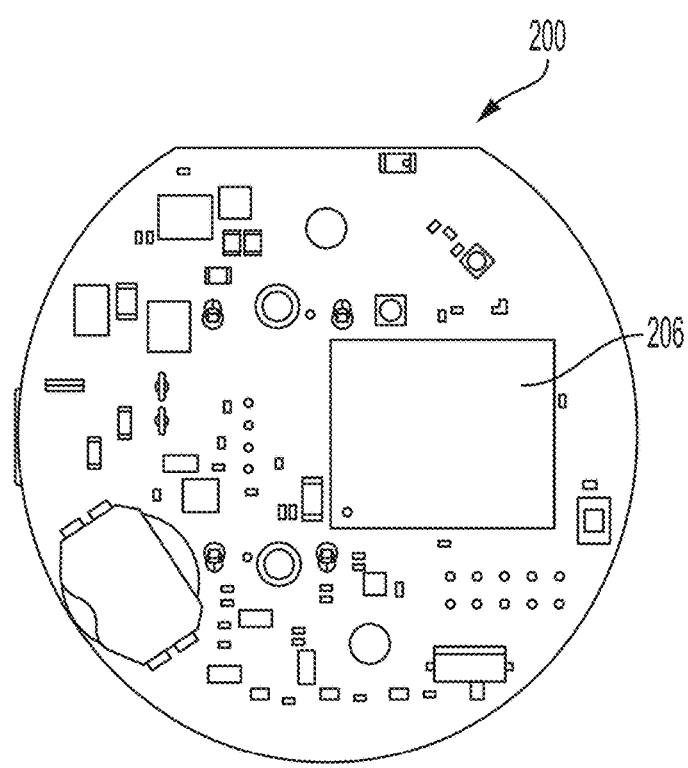
FIG. 4A is a top view of a printed circuit board (PCB) for an analyzer in accordance with the subject disclosure.
Figure 4B:
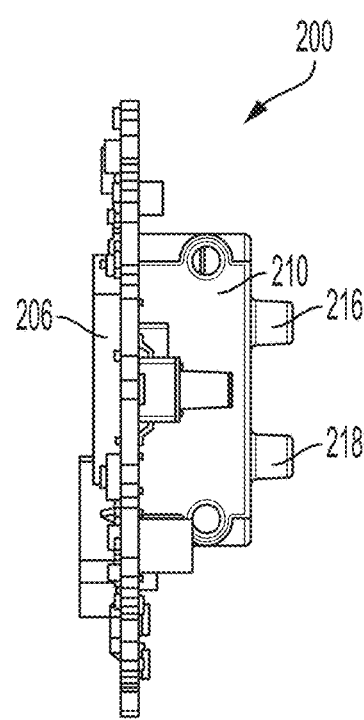
FIG. 4B is a side view of a printed circuit board (PCB) for an analyzer in accordance with the subject disclosure.
Figure 4C:
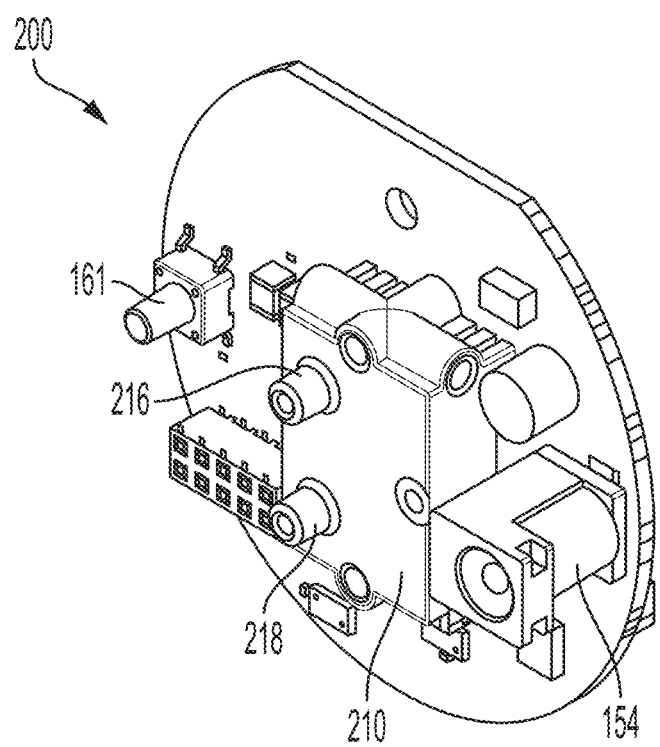
FIG. 4C is a bottom perspective view of a printed circuit board (PCB) for an analyzer in accordance with the subject disclosure.
Figure 4D:
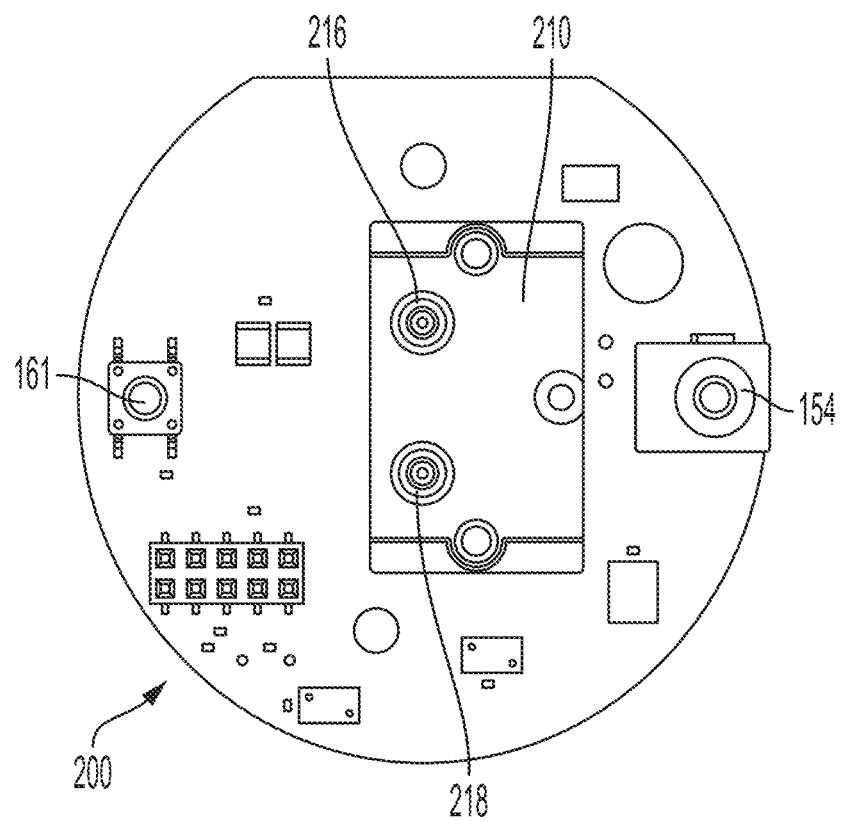
FIG. 4D is a bottom view of a printed circuit board (PCB) for an analyzer in accordance with the subject disclosure.

Still referring to FIGS. 2A-2D, the housing 132 has a divided interior 138 (see FIG. 3) extending between the inlet 134 and the outlet 136. As best seen in FIGS. 2A and 3, the interior 138 is enclosed by a lid 140. Screws 142 thread into mounting holes 144 to secure the lid 140 to the housing 132. The lid 140 includes a directional arrowhead 146 so that during installation, it is easy to identify the proper orientation of the analyzer 130. Similarly, the housing 132 also has an arrow 152 formed therein as best seen in FIG. 2D. The lid 140 also includes three annunciator LEDs 148a-c with respective labels 150a-c. In one embodiment, the LEDs 148a-c are blue, red and green respectively. Label 150a is a wireless communication icon. Label 150b is an "!" to indicate a warning condition. Label 150c is a power on/off icon. The lid 140 also includes ample areas 156 for including other information such as trademarks, barcodes and the like.

As best seen in FIGS. 2C and 2D, the housing 132 forms four mounting indentations 158 that are configured to securely and selectively engage four upstanding arms 109 of the battery pack 108 for clip mounting the battery pack 108 to the analyzer 130. The analyzer 130 also includes a power jack 154 for electrically connecting a power source such as the power supply 106 or the battery pack 108. Wires extending from the power source can be held in place by a clip 157, which is held in place by a screw 159. In one embodiment, the analyzer 130 has a button 161 that can reset the communication and/or other hardware.

Referring now to FIG. 3, an exploded perspective view of an analyzer 130 is shown. The interior 138 is divided into an upper portion 160 and a lower portion 162. The upper part 160 includes a porous vent 164 to the environment so that the upper portion 160 is at ambient pressure. A printed circuit board (PCB) assembly 200 mounts on threaded shoulders 166 in the upper portion 160. A standoff 174 forms a throughole 175 is in fluid communication with the lower portion 162 (e.g., the fluid network 12 when connected). A seal 168 and o-ring 170 extend around the throughole 175 to the PCB assembly 200 so that a pressure sensor can make a direct reading of pressure in the fluid network 12. The button 161 also mounts on the PCB assembly 200 and fits in a recess 163.

The upper portion 160 also include a pair of access passages 176a, 176b, each sealed with an o-ring 178. The passages 176a, 176b also allow fluid to flow between the upper portion 160 and the lower portion 162. To make sure that the upper portion 160 is otherwise sealed to the elements, a large o-ring 180 mounts in the upper portion 160 for sealing against the lid 140.

Figure 5:
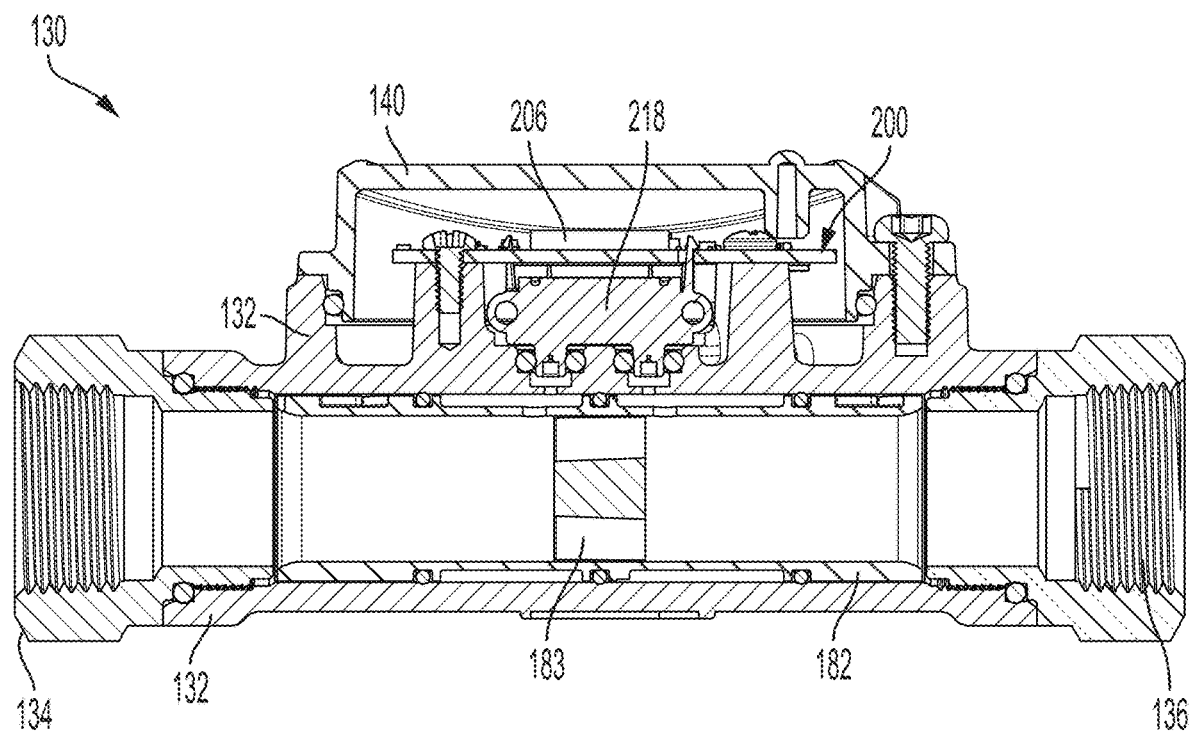
FIG. 5 is a cross-sectional view of an analyzer in accordance with the subject disclosure.

An elongated flowtube 182 is sealingly coupled in the lower portion 162 of the interior 138. Couplings 184 thread into the housing 132 to fix the flowtube 182 in place with o-ring seals 186. The flowtube 182 forms two orifices 188a, 188b aligned with the passages 176a, 176b. As best seen in FIGS. 2B and 5, the flowtube 182 includes a wagon wheel 183 intermediate the passages 176a, 176b. The wagon wheel 183 creates a pressure drop so that portion of the gas flow from the inlet 134 to the outlet 136 is scavenged to pass through the first port 176a and orifice 188a, then routed back via the second orifice 188b and port 176b as described in more detail with respect to FIG. 5. The flowtube 182 also includes directional flow arrows 190 for proper orientation during assembly.

Referring now to FIGS. 4A-D, various views of the PCB assembly 200 in isolation are shown. The PCB assembly 200 has a plurality of electronic components such as a processing module and memory module for data storage, processing and input/output operations. Various communication modules, such as a Bluetooth module and a WiFi module 206, provide short range as well as local and/or wider area networks communication ability.

The PCB assembly 200 includes two barometric pressure sensors. One pressure sensor generates a signal related to the flow of gas being delivered to the appliance. By being in fluid communication with throughole 175. The other pressure sensor is in the upper portion of the interior 138 and, as a result, reads ambient barometric pressure. The power jack 154 and reset button 161 are also mounted on the PCB assembly 200. The PCB assembly 200 further includes various electronic components such as resistors and capacitor but not explicitly discussed as one of ordinary skill in the art would be able to employ such components to accomplish the function of the PCB assembly 200 described herein.

The PCB assembly 200 has a differential pressure sensor 210 with an input port 216 and an output port 218. Referring additionally to FIG. 5, which is a cross-sectional view of the analyzer 130, the pressure sensor ports 216, 218 align with the flowtube orifices 188a, 188b, via the passages 176a, 176b, respectively. The wagon wheel 183 creates a pressure differential so that gas flow passes out orifice 188a into the input port 216, through the pressure sensor 210, out the output port 218 and back into flowtube 182 (e.g., the fluid network) via orifice 188a. The pressure sensor 210 can thus generate a differential pressure reading that can be converted into a flow reading. In one embodiment, the barometric pressure sensors are model MS560702BA03-50 from Measurement Specialties—TE Connectivity, the WiFi module 206 is model CC3200MODR1M2AMOBR from Texas Instruments, the processor/memory module 202 is model MB85RS2MTAPNF-G-BDERE1 from Fujitsu, and the differential pressure sensor 210 is model SDP800-500PA from Sensirion.

Figure 6:
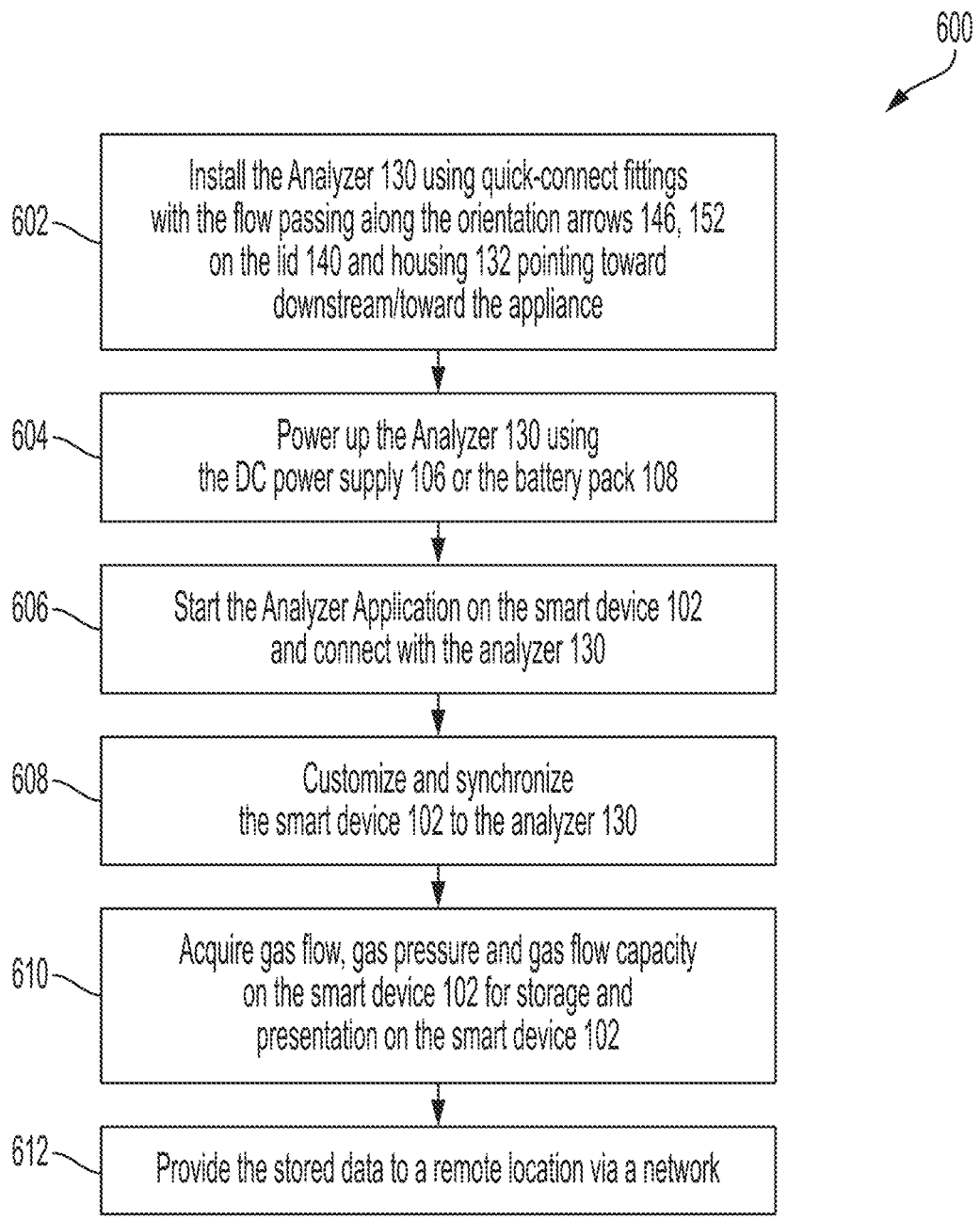
FIG. 6 is a flow diagram of a process utilizing the analyzer and smart device of FIG. 1.

Referring now to FIG. 6, a flow diagram of a process 600 utilizing the system 100 of FIG. 1 is shown. Preferably, the installation and use of the system is by qualified service personnel such as a plumber or electrician qualified to follow all relevant requirements, codes and standards. At step 602, the technician uses the shut-off valve 18 to stop flow in the fluid network 12 so that the analyzer 130 can be inserted downstream into the fluid network 12. In another embodiment, the fluid network is equipped with an automatic shut-off valve. Thus, the flow may be stopped from the smart device 102. Additionally, the automatic shut-off valve can be automatically activated in the event that the smart device 102 receives one or more signals indicating that a shutdown is required such as by excessive appliance movement, over-temperature reading(s), excessive flow, and the like.

Preferably, the analyzer 130 is immediately upstream of the gas device 10. The analyzer 130 is preferably installed vertically up or down or horizontally. In one embodiment, quick-connect fittings on flexible tubing are disconnected and coupled to the analyzer 130 with the flow aligned with orientation arrows 146, 152 on the lid 140 and housing 132, which point downstream toward the gas device 10. Once the leak tight installation is verified, the shut-off valve 18 is used to turn on the gas flow and the process 600 proceeds to step 604.

At step 604, the battery pack 108 is coupled to the analyzer 130 by snapping the upstanding arms 109 into the mounting indentations 158. To power up the analyzer 130, the power cord 110 is inserted in the port 154. Alternatively, the power cord 107 of the DC power supply 106 can be used to power up the analyzer 130. During initial power up, the green LED 148a is energized for 1 second, then all the LEDs 148a-c become energized before changing to the blue LED 148c blinking, which indicates normal operation. The blue LED 148c will double-blink to indicate communication with the smart device 102.

At step 606, the smart device 102 is linked to the analyzer 130. In one embodiment, the smart device 102 is running a free software application specific to the analyzer 130. The software application may be provided by the manufacturer of the system 100. It is also envisioned that the system 100 could be permanently installed with the software application provided by the manufacturer of the gas device 10. The software application will present an icon that allows connection with the analyzer 130. Once selected, the smart device 102 will present any analyzers 130 in range, with respective serial numbers, so that the user can establish the desired communication link(s).

Figure 7A:
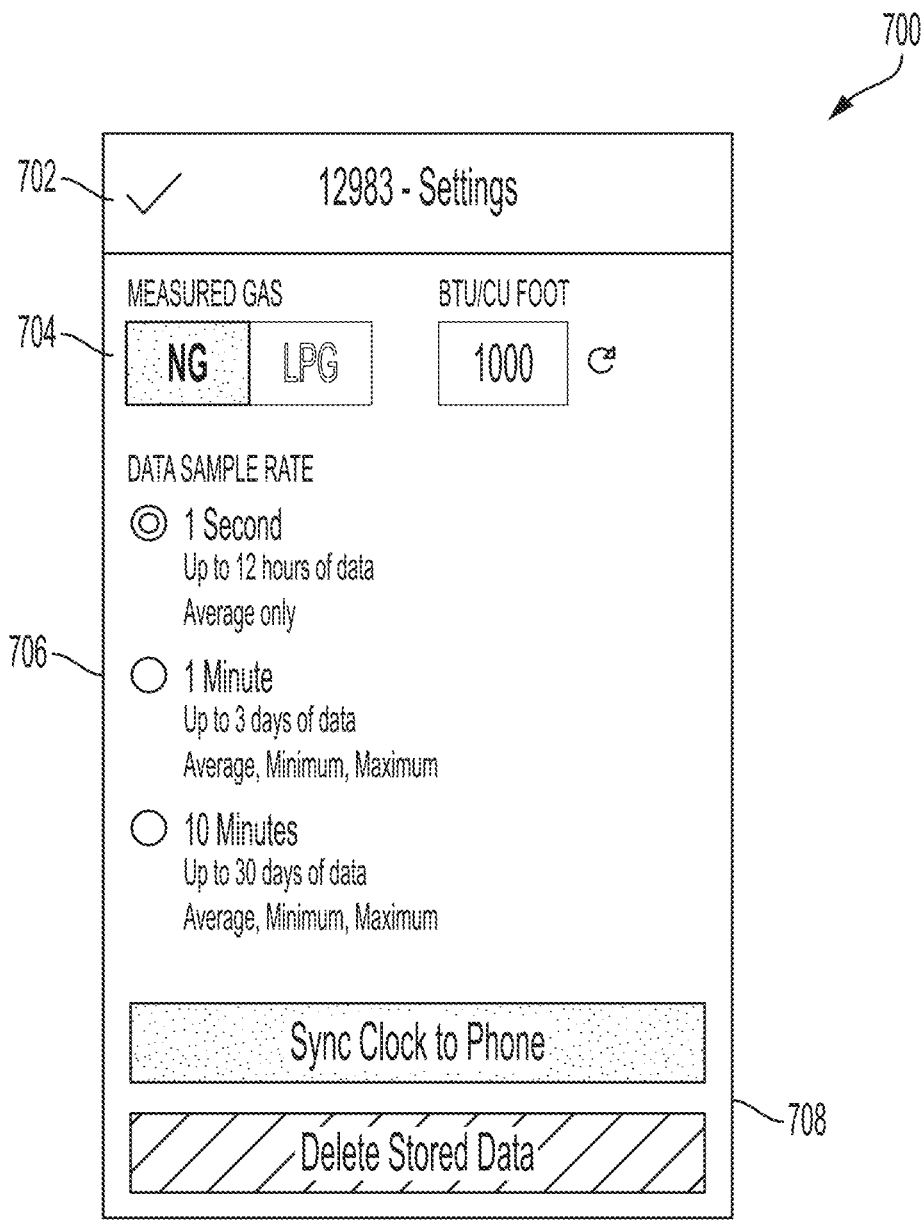
FIG. 7A is a screenshot of selecting various settings in accordance with the subject disclosure.

At step 608, the technician customizes the analyzer and synchronizes the analyzer 130 to the smart device 102. Various parameters and settings may be changed. Referring now to FIG. 7A, a screenshot 700 of selecting various parameter is shown. The smart device 102 has a touch screen 104 so that the technician can tap or select displayed boxes, radial buttons and the like to intuitively modify parameters and execute actions. The screenshot 700 has a heading section 702 that may include such information as the analyzer serial number. Another section 704 allows selecting between natural gas and propane. By default, the software application records BTU calculations with a value of 1000 for natural gas and a value of 2500 for propane. The value can be customized in the software application and in data exports as various gas suppliers may provide higher or lower values.

A central section 706 of screenshot 700 allows selection of a data sample rate between every 1 second, 1 minute or 10 minutes with associated varying time periods for which the data can be stored. A bottom section 708 provides a prompt so that the user can synchronize the internal clock of the analyzer 130 with the internal clock of the smart device 102. The stored data (e.g., history logs) can also be deleted in the bottom section 708. To save the adjusted settings, the user simply taps the checkmark in the heading section 702.

Figure 7B:
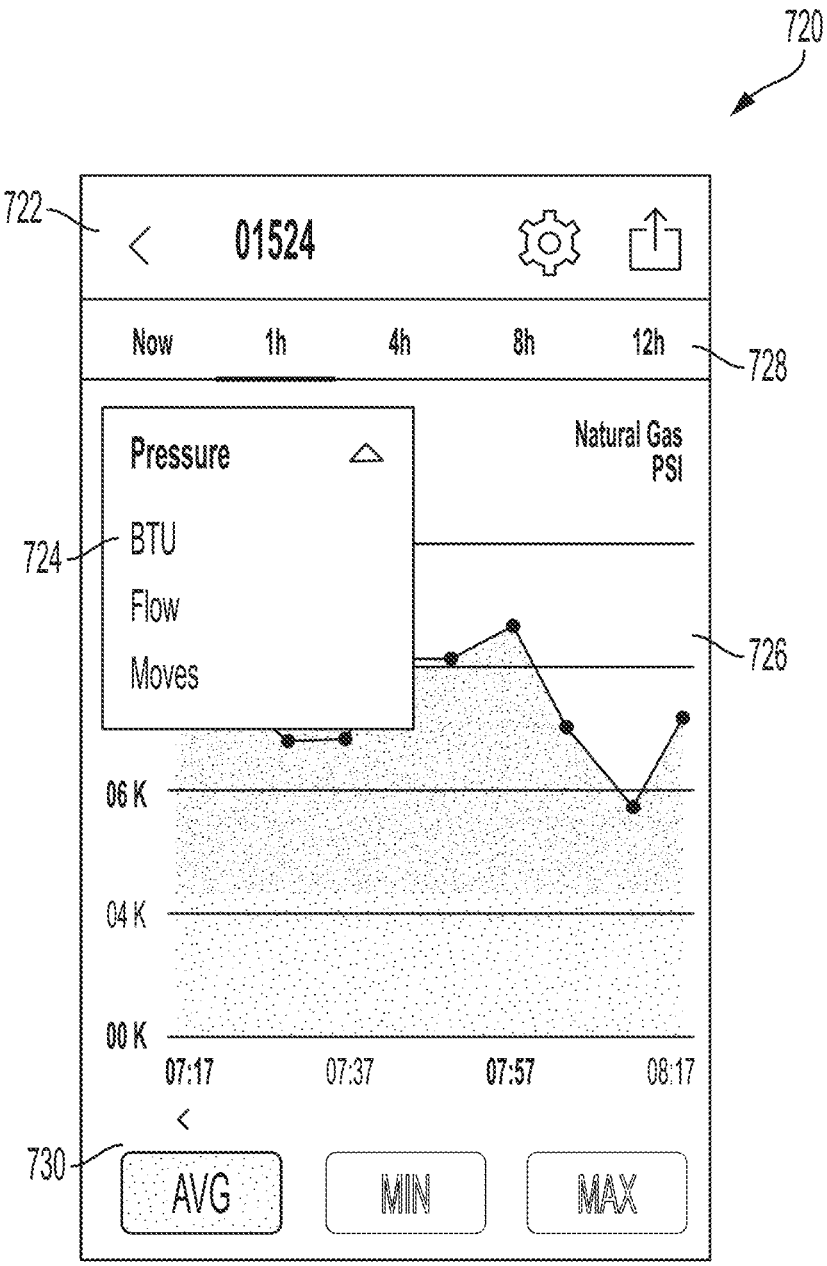
FIG. 7B is a screenshot of selecting a parameter for display in accordance with the subject disclosure.

Referring now to FIG. 7B, a screenshot 720 for selecting a parameter for display is shown. A heading section 722 includes an icon to return to the settings screenshot 700 as well a second icon to export data. With the smart device 102 connected to WiFi or cellular service, the uploaded data can be sent via email using a CSV attachment. A pulldown menu 724 in the central section 726 allows selection of the parameter to display. In one embodiment, the parameter is selected from the group consisting of pressure (in/H$_2$O) in the fluid network and/or ambient, BTU (BTU/hr), flow (CFH), movement, temperature (° F.) and the like. Temperature is typically from a separate sensor included in the housing 132 of the analyzer 130 but could also be from a separate sensor coupled to the gas appliance 10 and communicating with the system 100. Similarly, the system 100 may include one or more accelerometers, coupled to the analyzer 130 or gas device 10, for detecting movement thereof. A band 728 is presented to select a time period for display such as the current reading, 1 hour of data, 4 hours of data and so on. Arrows allow scrolling through the data. A lower section 730 allows selection of one or more of the average, minimum or maximum data readings based on the sample rate set above.

Once properly configured, the process 600 of FIG. 6 proceeds to step 610 to acquire gas flow, gas pressure, gas flow capacity and other selected parameters on the smart device 102 for storage and presentation on the smart device 102. The analyzer 130 is precalibrated prior to installation. For example to calculate flow, the analyzer 130 is loaded with performance curves generated using ambient air. The performance curves are a set of differential pressure readings at across the expected range of flow values so that during operation, actual differential pressure readings can be converted to accurate flow values.

Figure 7C:
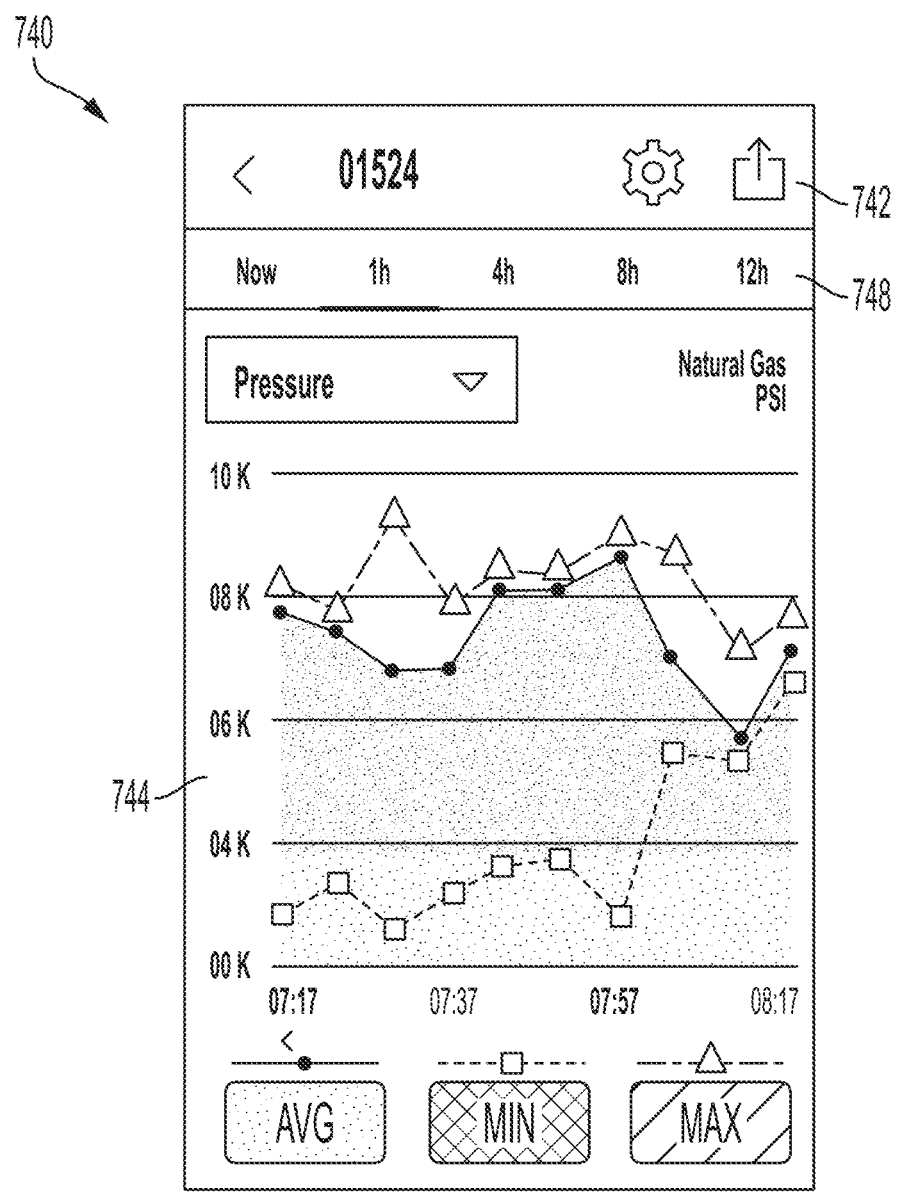
FIG. 7C is a screenshot displaying pressure in accordance with the subject disclosure.

Referring now to FIG. 7C, a screenshot 740 displaying pressure is shown. Again, a heading section 742 provides the same information noted above. A band 748 is presented to select a time period for the display. A central section 748 presents the graph, which includes any or all of the average, the minimum and the maximum. In one embodiment, the minimum and the maximum are related to a certain time period of data collection such as the last minute of data. As noted above, not only can the data be stored for any or all of the parameters but the stored data can be sent via email at step 612.

As can be seen, the gas flow may be monitored several different ways over long periods of time. By review of the data, in realtime or retrospectively, the technician can have confidence in the proper operation or identify issues more easily for investigation and correction. The smart device 102 generates reports, which may be customized for any particular application. A service technician/installer/electrician/plumber uses the system to verify gas flow and gas pressure at initial product start-up and during the life of operation of the appliance for troubleshooting and safety. The service technician can review various charts of the recorded parameters to note improper trends and events, leading to corrective action in a timely manner.

In one embodiment, the system is configured to operate in a range of 15,000 to 500,000 BTU/hour. The analyzer preferably is a black powder coated cast aluminum housing with black anodized extruded aluminum end fittings and an injection molded lid or face. The fittings may be ½" or ¾" NPT among other sizes.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, electronics, printed circuit boards, sensors, memory, processors and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology as exemplified by the appended claims.

What is claimed is:

1. A method of installing and servicing a gas appliance comprising the steps of:
   temporarily installing an analyzer upstream from an inlet of the gas appliance for an installation or servicing time period, the analyzer having at least one sensor; and connecting a smart device to the analyzer using a short range wireless communication protocol for receiving at least one signal from the at least one sensor.

2. The method as recited in claim 1, wherein, the at least one signal comprising a first signal relating to a flow of gas being supplied to the gas appliance, and a second signal relating to a pressure of the gas being supplied to the appliance, wherein the smart device calculates a gas flow capacity based on the first signal.

3. The method as recited in claim 1, further comprising the steps of:
providing a first quick-connect fitting for an inlet of the analyzer;
providing a second quick-connect fitting for an outlet of the analyzer; and
providing indicia on the analyzer configured to identify the inlet and the outlet of the analyzer.

4. The method as recited in claim 1, further comprising the step of providing indicia on the analyzer configured to indicate a warning condition, a power on/off condition, and a wireless communication active status.

5. The method as recited in claim 2, wherein the first signal is generated by a differential pressure sensor and the second signal is generated by a barometric pressure sensor.

6. A method for monitoring gas flow and pressure to a gas appliance in a fluid network, the method comprising the steps of:
temporarily installing an analyzer upstream from an inlet of the gas appliance for an installation or servicing time period, wherein the analyzer includes:
a housing defining an inlet, an outlet, and an interior in fluid communication with the inlet and the outlet; and
a first pressure sensor;
generating, via the first pressure sensor, a first signal relating to a flow of gas being supplied to the gas appliance;
communicating with the analyzer via a smart device using a short range wireless communication protocol, wherein the smart device includes a user interface and is configured to monitor, store, and display data; and
presenting, via the smart device, the flow of gas and a capacity of the flow of gas to a user based on the first signal.

7. The method as recited in claim 6, further comprising the step of generating, via a second pressure sensor included in the analyzer, a second signal relating to a pressure of the gas being supplied to the appliance.

8. The method as recited in claim 6, further comprising the step of generating, via a third pressure sensor included in the analyzer, a third signal relating to an ambient barometric pressure.

9. The method as recited in claim 6, wherein the first pressure sensor of the analyzer is a differential flow sensor.

10. The method as recited in claim 6, further comprising the steps of:
communicating, with the analyzer and/or the smart device, with a safety shut-off valve connected to the fluid network; and
selectively actuating, with the analyzer and/or the smart device, the safety shut-off valve based upon the first signal being outside a predetermined value.

11. The method as recited in claim 10, wherein the analyzer and/or the smart device selectively actuates the safety shut-off valve based upon a signal from a temperature sensor in communication with the analyzer and/or the smart device.

12. The method as recited in claim 10, further comprising the steps of:
communicating, with the analyzer and/or the smart device, with an accelerometer; and
selectively actuating, with the analyzer and/or the smart device, the safety shut-off valve based upon a signal from the accelerometer sensor.

13. The method for monitoring gas flow and pressure to a gas appliance in a fluid network, the method comprising the steps of:
halting a flow of gas into the fluid network using a shut-off valve;
temporarily installing an analyzer into the fluid network using quick-connect fittings for an installation or servicing time period, downstream of the shut-off valve and upstream of the gas appliance;
commencing the flow of gas into the fluid network using the shut-off valve;
sensing, via a sensor in the analyzer, a differential pressure reading across an inlet and outlet port of the analyzer;
relaying, via the analyzer, the differential pressure reading to a smart device using a short range wireless communication protocol; and
presenting to a user, via the smart device, data relating to the differential pressure reading.

14. The method as recited in claim 13, further comprising the step of setting an analyzer gas sample rate via the smart device.

15. The method as recited in claim 13, further comprising the step of selecting a parameter to display on the smart device based on the differential pressure reading, the parameter selected from the group consisting of: pressure in the fluid network, ambient, BTU, flow, movement, and temperature.

* * * * *